(12) United States Patent
Haas et al.

(10) Patent No.: US 10,489,678 B2
(45) Date of Patent: *Nov. 26, 2019

(54) IMAGE COMPARISON TOOL TOLERANT TO DEFORMABLE IMAGE MATCHING

(71) Applicant: Varian Medical Systems International AG., Cham (CH)

(72) Inventors: Benjamin Haas, Brittnau (CH); Thomas Coradi, Lenzburg (CH); Michael Waschbuesch, Rheinfelden (CH)

(73) Assignee: VARIAN MEDICAL SYSTEMS INTERNATIONAL AG., Cham (CH)

( * ) Notice: Subject to any disclaimer, the term of this patent is extended or adjusted under 35 U.S.C. 154(b) by 121 days.

This patent is subject to a terminal disclaimer.

(21) Appl. No.: 15/707,555

(22) Filed: Sep. 18, 2017

(65) Prior Publication Data
US 2018/0068204 A1 Mar. 8, 2018

Related U.S. Application Data

(63) Continuation of application No. 14/685,307, filed on Apr. 13, 2015, now Pat. No. 9,767,380.

(51) Int. Cl.
*G06K 9/00* (2006.01)
*A61B 6/00* (2006.01)
(Continued)

(52) U.S. Cl.
CPC ........... *G06K 9/6206* (2013.01); *G06K 9/621* (2013.01); *G06K 9/6262* (2013.01); *G06T 7/11* (2017.01);
(Continued)

(58) Field of Classification Search
USPC ....... 382/100, 103, 106, 128–134, 168, 173, 382/181, 209, 219, 232, 254, 274, 276,
(Continued)

(56) References Cited

U.S. PATENT DOCUMENTS 9,122,959 B2 * 9/2015 Zhou ...................... G06K 9/66
2008/0240527 A1 * 10/2008 Keller ................ G06K 9/00127
382/128

(Continued)

OTHER PUBLICATIONS

Multi-Atlas Based Segmentation of Brain Images: Atlas Selection and Its Effect on Accuracy; Aljabar, et al.; Academic Press; Orlando FL, US; vol. 46, No. 3, Jul. 1, 2009; pp. 726-738.
(Continued)

*Primary Examiner* — Seyed H Azarian

(57) ABSTRACT

An apparatus and method for determining an image similarity based on image features. In one aspect, the image similarity determination is based on an image comparison tool. The image comparison tool may be trained, by a machine-learning system, to estimate a similarity between images based on a subset of image data comprised by image features. The estimate may be an estimate of how similar structures found in the images would be following a geometric transformation of some of the structures. In one aspect, an atlas image for performing automatic segmentation of an image is determined according to a comparison made using the image comparison tool.

20 Claims, 5 Drawing Sheets

(51) Int. Cl.
 *G06K 9/62* (2006.01)
 *G06T 7/35* (2017.01)
 *G06T 7/11* (2017.01)
 *G06T 7/149* (2017.01)

(52) U.S. Cl.
 CPC ............... *G06T 7/149* (2017.01); *G06T 7/35* (2017.01); *G06K 2209/05* (2013.01); *G06T 2207/10072* (2013.01); *G06T 2207/20081* (2013.01); *G06T 2207/20128* (2013.01); *G06T 2207/30004* (2013.01)

(58) Field of Classification Search
 USPC ....... 382/286–291, 305, 220; 1/1; 378/4, 21, 378/41
 See application file for complete search history.

(56) References Cited

U.S. PATENT DOCUMENTS

| | | |
|---|---|---|
| 2011/0235884 A1* | 9/2011 | Schreibmann ......... A61B 6/037 382/131 |
| 2011/0317896 A1 | 12/2011 | Huber et al. |
| 2013/0034203 A1* | 2/2013 | Wang .................. A61B 6/03 378/41 |
| 2014/0247977 A1 | 9/2014 | Han |
| 2014/0328527 A1* | 11/2014 | Zhou .................. G06K 9/66 382/131 |

OTHER PUBLICATIONS

Learning-Based Atlas Selection for Multiple-Atlas Segmentation; Gerard, et al.; 2014 IEEE Conference on Computer Vision and Pattern Recognition; Jun. 23, 2014; pp. 3111-3117.

* cited by examiner

IMAGE COMPARISON TOOL TOLERANT TO DEFORMABLE IMAGE MATCHING

This application is a continuation of U.S. application Ser. No. 14/685,307, now U.S. Pat. No. 9,767,380, filed Apr. 13, 2015, which is incorporated herein by reference in its entirety.

TECHNICAL FIELD

The present invention pertains generally to image processing and, in particular, involves a mechanism for comparing images generated for the purposes of radiotherapy planning.

BACKGROUND

The usage of medical imaging devices to diagnose and plan treatment for various internal ailments is well known. Often, an imaging device such as an X-ray device, Computer Tomography (CT), or Magnetic Resonance Imaging (MRI) device is used to generate one or more initial scans or images of the area of interest. Typically, once an image has been acquired, critical structures (e.g., regions or organs) disposed in the target area are specifically identified so that treatment may be optimally directed. Conventional medical imaging techniques include techniques for automatically identifying ("segmenting") organs and large structures. These techniques often include delineating adjacent structures by derived radiodensities and classifying the structures according to their relative positions and derived densities with known values. However, even an automatic process for segmentation of anatomical structures can be computationally expensive and time-consuming.

One approach to reduce the time and resources involved in labeling structures of interest in a medical image is to utilize an annotated template image, or "atlas." An atlas is an image (a tomography image, in the case of a medical image) that has been segmented previously and whose structures of interest (e.g., anatomical structures) have been labeled. Typically, an atlas image is selected from a number of potential atlas images via a matching process with the target image (e.g., current patient image), where the matching process includes deformable registration of the target image with each potential atlas image in order to make a comparison. Deformable registration is a process of establishing a spatial correspondence between (at least two) images using image data (e.g., pixel intensity values), bringing both images into a similar geometric framework in order to more accurately compare similar features within the images. For example, the deformation may include a deformation vector field, whereby a first image (e.g., the target image) is transformed in order to compare (e.g., match) against a potential atlas image. The matching process may, following the deformable registration, rank potential atlas images according to some criteria, and determine the atlas to be that potential image which is ranked most highly according to the chosen ranking criteria.

For atlas-based automatic segmentation, an atlas is used as a template image to aid in structure identification and labeling in a target image, such that structures of interest in the new image may be readily labeled and a treatment plan for the new patient may be expedited. An atlas image may also have radiation dosimetry and geometric planning information associated with its labeled structures.

It is appreciated by those of skill in the art that the particular atlas chosen for use in atlas-based automatic segmentation has a substantial impact on the final segmentation results for the new image. While atlas-based automatic segmentation offers efficiency improvements for labeling a new patient image and developing a radiation treatment plan, the process of selecting an optimal atlas for a new patient image from a set of potential atlas template images can still be significantly time-consuming and labor intensive. The time and labor increases with an increasing number (as well as an increasing data-density) of potential atlas template images, each of which requires manipulation according to the above, in order to find an optimal atlas for automatic segmentation.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In one aspect, embodiments according to the present disclosure provide an apparatus and method for determining an image similarity based on image features. In one aspect, the image similarity determination is based on an image comparison tool. The image comparison tool may be trained, e.g., by a machine-learning system, to estimate a similarity between images based on a subset of image data comprised by image features. The estimate may be an estimate of the similarity between structures found in the images following a geometric transformation of some of those structures. In one aspect, an atlas image for performing automatic segmentation of an image may be determined according to a comparison made using an image similarity metric.

According to embodiments of the present invention, a method for training a machine learning system to generate an image comparison tool is provided. The method includes accessing a first medical image, which includes first pixel data depicting a first set of structures. The method further includes accessing a second medical image, which includes second pixel data depicting second structures. The method includes establishing a similarity value based on a comparison of the first and second pixel data. The method includes extracting a first features group from a first subset of the first pixel data, and a second features group from a second subset of the second pixel data, and training a machine learning system by using the first and second features groups as inputs to the machine learning system and using the similarity value as an expected output of the machine learning system. The method includes generating an image comparison tool, for example, a similarity metric, based on the training.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF DRAWINGS

The accompanying drawings, which are incorporated in and form a part of this specification, illustrate embodiments of the invention and, together with the description, serve to explain the principles of the invention.

DETAILED DESCRIPTION

Figure 1:
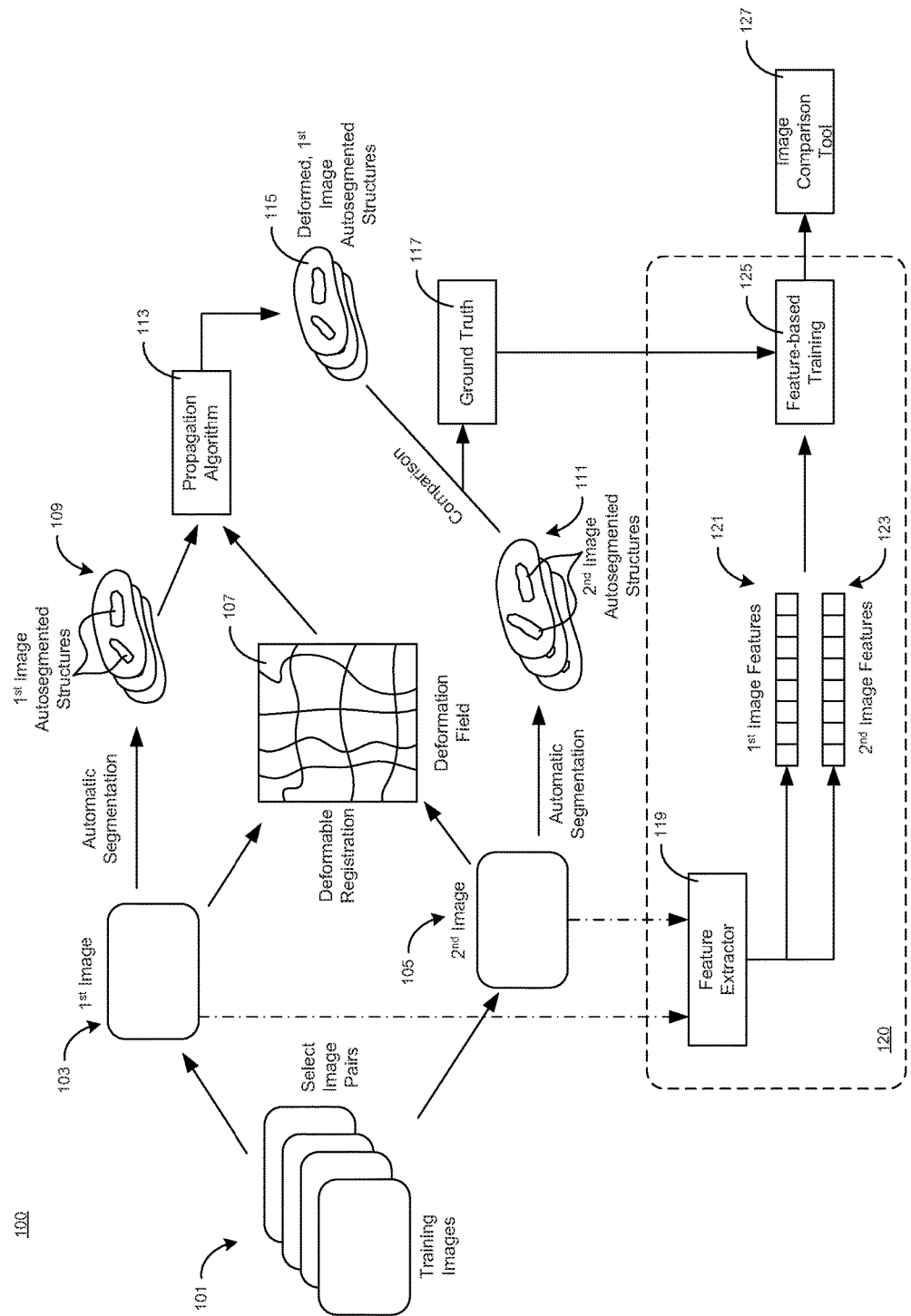
FIG. 1 depicts an exemplary training of an image comparison tool, in accordance with embodiments of the present invention.

In one aspect, embodiments of the present disclosure provide an image comparison tool to generate a similarity estimation (e.g., via a similarity metric) that accounts for image deformation and registration without the need of explicit calculation thereof. The image comparison tool can be used in many scenarios as described herein, as well as in other domains. Similarity may be calculated based on image features. Such features are typically chosen by the developer of the system such that they are discriminative (contain significant information) and can be calculated quickly. The comparison tool may be trained using a ground truth similarity value that is generated by explicitly using a deformable registration on a number of image pairs in measuring the similarity of structures of interest. For use in segmentation, the ground truth similarity value may be based on similarity of structures that are known in both images (preferably, structures that can reliably be found by automatic segmentation), and comparing those structures after one image has been deformed. During a training phase of a machine learning system, weights may be sought for the different features such as to obtain agreement with the ground truth similarity value. FIG. 1 provides an overview of the training procedure.

In knowledge-based radiotherapy it is often of interest to find patients images in a data storage that are similar to a given patient image. For atlas-based automatic segmentation ("autosegmentation"), geometric- and dosimetric treatment plan optimization, as well as sanity checking, a similarity in terms of geometry or anatomy rather than, or in addition to, a similar disease pattern may be desirable. At present, radiotherapy planning uses 3D computed tomography most frequently. Thus, this is an important modality for such similarity measurements to provide valuable information.

There are segmentation solutions that exist which offer atlas-based autosegmentation, and which allow customers to create their own atlases. In this context, an atlas is a tomography image (atlas image) with labeled anatomical structures (atlas structures). An aspect of performing atlas-based autosegmentation is determining a deformation vector field that transforms the atlas image to match the image of an actual patient, and to then obtain structures for the actual patient image by deforming the atlas structures using the determined vector field. Future advances may soon provide a more powerful so-called multi-atlas segmentation, which will use more than one atlas to segment a patient image. It is known that the choice of atlas(es) has a great impact on the final segmentation results. In order to obtain reasonable structures on the patient image, the chosen atlas images have to be sufficiently similar to the patient image. An efficient approach offering multi-atlas based segmentation benefits from finding atlases automatically.

For optimization in generating a treatment plan for a new patient, finding similar images in a patient data storage in order to reuse radiotherapy information (such as treatment plan geometry) from previously treated patients is of substantial value. Additionally, similar images from a patient data storage may provide insight into potential dose distributions for the new patient (if such patient data contains dose distribution information), based on the dose distributions from similar cases. For an automatic sanity check, one may want to analyze an image in order to determine if it is actually the same patient as another image, or to check the monitor units defined for a treatment field with the ones used in similar geometric situations, etc.

An efficient manner to find a relevant similarity between images is provided by embodiments of the present disclosure. The similarity measurement may take into account the possibility that images are deformed to some extent prior to determining a similarity (e.g., a "match") between them. This measurement may reflect the significant differences, e.g., in the geometric composition of the images, that remain after a given deformable registration algorithm has been applied to match the images. Furthermore, since it is not practical to explicitly compute deformable registration for a simple comparison of pairs of images from a data storage, e.g., during an atlas search for a patient image, methods according to the present disclosure provide a similarity comparison based on a subset of image data.

As used herein, the term "image" or "medical image" may be used interchangeably and refers to an image created by an imaging system, which includes but is not limited to x-ray radiography, X-ray computed tomography (CT) imaging, magnetic resonance imaging (MRI), positron emission tomography (PET) imaging, single photon emission computed tomography (SPECT) imaging, and ultrasound (US) imaging. A medical image can be either a 2D image or a 3D image.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, and components, have not been described in detail as not to unnecessarily obscure aspects and features of the subject matter.

Portions of the detailed description that follows are presented and discussed in terms of a method. Although steps and sequencing thereof are disclosed in figures herein (e.g., FIG. 2) describing the operations of this method, such steps and sequencing are exemplary. Embodiments are well suited to performing various other steps or variations of the steps recited in the flowchart of the figure herein, and in a sequence other than that depicted and described herein.

Embodiments described herein may be discussed in the general context of computer-executable instructions residing on some form of computer-usable medium, such as program modules, executed by one or more computers or other computing devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

In the following embodiments, a technique to determine an atlas image for use in atlas-based autosegmentation is described. Embodiments include a method for training a machine learning system to generate an image comparison tool.

Training a Machine Learning System to Generate an Image Comparison Tool

In one aspect, embodiments of the present disclosure provide an image similarity estimation (metric) that accounts for image deformation and registration without explicit calculation thereof. Similarity may be calculated based on image features. Such features are typically chosen by the developer of the system such that they are discriminative (contain significant information) and can be calculated quickly. The comparison tool may be trained using a ground truth similarity value that may be generated by explicitly using a deformable registration on a number of image pairs and measuring the properties of interest afterwards. For example, when used in a segmentation application, the ground truth similarity value may be based on similarity of structures that are known in both images (preferably, structures that can reliably be found by automatic segmentation), and comparing those structures after one image has been deformed. For treatment plan optimization the ground truth similarity value may be based on, for example, similarity of radiation dose distributions, or alternatively, treatment plan geometries. In one embodiment, during a training phase for a machine learning system weights are sought for the different features such as to obtain an optimal agreement between a features-based comparison and the ground truth similarity value. Alternatively, correlating the rankings of the comparison tool and the ground truth may be done using regression tree analysis, or support vector regression.

FIG. 1 is a schematic illustration of an exemplary training of a machine learning system 100 to generate an image comparison tool 127, in accordance with an embodiment of the present disclosure. The image comparison tool 127 may be trained on a set of training images 101. For each pair of images (e.g., first image 103 and second image 105) a ground truth similarity value 117 may be generated and groups of features (e.g., first image features group 121 and second image features group 123) are extracted by a feature extractor 119, which in an embodiment is comprised by a training system 120. The extracted features are inputs for a feature-based training 125, with the ground truth similarity value 117 being the expected output used to train the machine learning system in order to generate an image comparison tool 127. In an embodiment the image comparison tool 127 may be an image similarity metric.

The ground truth similarity value 117 may be a similarity value for the two images provided by an expert, e.g., by a medical practitioner. According to an embodiment, during training an expert provides a similarity value for each pair of images compared in a training set of images. In an embodiment the ground truth may be based on a geometric comparison of in-common structures identified in the first image 103 and the second image 105, e.g., based on autosegmented structures 109 and 111. In an embodiment the ground truth may be based on a direct comparison of autosegmented structures from both images, after the images are aligned by deformable registration according to a deformation field, e.g., deformation field 107. In this disclosure, "registration" may mean placing two images in the same geometrical framework, which permits a more accurate subsequent point-by-point comparison of image pixel data. The deformed $1^{st}$ image autosegmented structures 115 may be generated by using the determined deformation field 107 and a suitable propagation algorithm 113. Propagating the autosegmented structures 109 may be performed, for example, by applying the deformation field 107 to the autosegmented structures 109 and copying the resulting output onto the second image 105.

In an embodiment, the ground truth 117 is not generated explicitly by comparing structures 109 and 111, but rather may be generated (following deformable registration) according to a comparison of pixel values from image 103 and image 105. For example, the comparison of pixel values may be the average difference, and the ground truth 117 may be the inverse of the average difference. Likewise, the ground truth 117 may be based upon, for example, similarity of radiation dose distributions associated with first image 103 and second image 105, or alternatively, treatment plan geometries associated with first image 103 and second image 105. Still further bases for ground truth generation are consistent with the spirit and scope of the present disclosure.

The image comparison tool 127 may be trained by comparing features only, where the features are extracted from images and/or their automatically segmented structures without the use of deformable registration. The features are determined from the image pixel data, and may be, for example, contours of anatomical structures, bone diameters, an amount of water present, fat tissue present, size of lung tissue, a tumor contour, etc.—any features that are determined to be discriminative by an expert for training of the machine learning system are consistent with the spirit and scope of the present disclosure. In pattern recognition, feature extraction may be a form of dimensionality reduction (e.g., features represent a subset of image pixel data) involving the use of an algorithm to detect and isolate various portions or shapes (features) of an image determined to be discriminative regarding a patient. A number of methods and algorithms for feature extraction are known to one skilled in the art.

Providing the ground truth 117 that may be based upon, for example, a deformed, registered image comparison as an expected output to a machine training system causes the feature-based training 125 to generate an image comparison tool 127 able to provide an estimate of image similarity following image deformation and registration. The estimate of image similarity may be trained to use features extracted by the feature extractor 119, e.g., features group 121 and features group 123, to perform the comparison, where the features may be extracted from image pixel data not subjected to geometric transformation (e.g., from non-deformed image data). In this manner the image comparison tool 127 may be able to make an estimate of how large the remaining differences would be between two images following image deformation and registration, without the computational cost of actually performing the deformation and registration in comparing the first image 103 and second image 105. Rather, the image comparison tool comparison 127 may be performed by comparing features extracted from first image 103 and second image 105.

In an embodiment, the image comparison tool 127 may be trained to estimate image differences for particular structures, specifically, the particular structures used to generate a ground truth comparison 117. Thus, if the ground truth 117 may be based on a comparison of, for instance, image structures depicting a liver, an image comparison tool comparison 127 of bone structures within two images may not provide an accurate comparison. Since the deformation field 107 may be generated to provide an optimal match between selected image structures present in first image 103 and second image 105—and the deformed, registered image may be optimized to provide the best geometric agreement between those selected structures, not necessarily all structures present in the images—the resultant ground truth 117 may be based upon a comparison of those selected image structures.

In an embodiment according to the present disclosure, a number of ground truth comparisons 117 are able to be generated for a number of different structures of interest in the image, with a corresponding image comparison tool 127 generated and "tuned" to the particular structure(s) upon which the ground truth comparison 117 may be based; e.g., an image comparison tool 127 for comparing a liver contour, an image comparison tool 127 for comparing bone structures, etc. Alternatively, the ground truth 117 may be based on a combination of selected structures from the images, and the resulting image comparison tool 127 may be generated for making comparison estimates based on the selected combination of structures. Therefore, the image comparison tool 127 may be able to provide an efficient search for a suitable atlas image for autosegmentation of a current (new, or target) patient image, based upon selected structures determined to be of interest.

In an embodiment, training includes tuning internal weights of the image comparison tool in order to optimize its image ranking behavior with respect to the ranking provided by the ground truth (e.g., as close as possible). In an embodiment extracted features are grouped into one or more categories. These categories may include, but are not limited to, anatomical structures, bone diameters, an amount of water present, fat tissue present, size of lung tissue, a tumor contour, etc. During training each category has a weight determined which provides a best agreement between the image comparison tool 127 comparison and the ground truth 117. The machine learning system 100 may be trained using many comparisons of different combinations of training images from training images 101, such that the generated image comparison tool 127 may be optimized, e.g., the comparison using the feature-based comparison may be brought into close agreement with the ground truth based comparison. For instance, the error between the two comparisons may be minimized.

Training is not limited to determining internal weights of categories. In an embodiment, training includes comparing the ground truth value with a feature-based ranking according to a regression tree analysis. In an embodiment, training includes comparing the ground truth value with a feature-based ranking according to a support vector regression. Still further means of correlating the ground truth value and a feature-based value, known to one skilled in the art, may be used in training the image comparison tool 127 and are consistent with the spirit and scope of the present disclosure.

The deformation field 107 may be generated by mapping dissimilarities of the features of the two images, e.g., dissimilarities of the features described above. In one embodiment, the deformation field 107 may be generated by establishing a correspondence for each pixel of a common structure or anatomical region in the first image 103 with an equivalent pixel in the second image 105. The positions of the pixels are compared and the relative displacement between a pair of corresponding pixels is then determined to derive a relativity between the pixels. Corresponding pixels may be identified by comparing the respective pixel intensities relative to the rest of the image, and the correspondence may be implemented as a three dimensional vector field, for example. Alternatively, the correspondence may also be implemented by a plurality of mathematical functions which express the relativity between two corresponding points.

Figure 2:
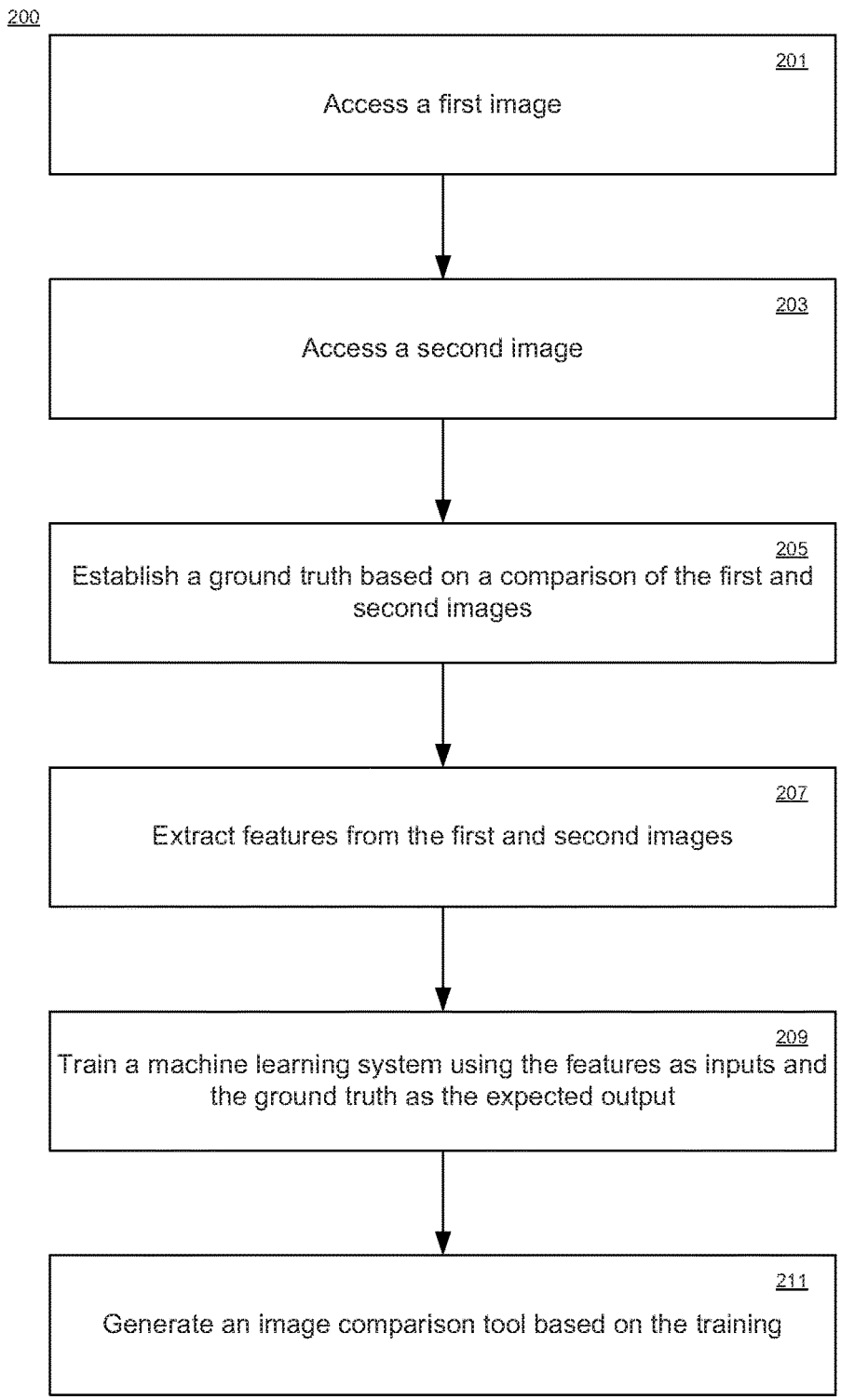
FIG. 2 depicts a process for training a machine learning system to generate an image comparison tool, in accordance with embodiments of the present invention.

FIG. 2 is a flowchart 200 of a method for training a machine learning system to generate an image comparison tool in accordance with one embodiment. Steps 201-211 describe exemplary steps comprising the process depicted in flowchart 200 in accordance with the various embodiments herein described. In one embodiment, the flowchart 200 may be implemented as computer-executable instructions stored in a computer-readable medium and performed by a computing device executing a process for training a machine learning system to generate an image comparison tool.

At step 201, a first image comprising a first plurality of structures and one or more manually or automatically contoured effects is accessed. The first image may comprise, for example, a first data scan of a CT data set generated by a medical imaging device. The first image may also consist of the display of data acquired during an initial diagnostic CT scan. According to some embodiments, data for the entire data set may be pre-imaged and stored in a data storage repository (such as a memory), which is accessed at step 201. The first image may comprise a plurality of anatomical features or structures. These features may include, but are not limited to, organs, tumors, lesions and the like. Some or all of these features may be automatically segmented according to various identification and segmentation techniques implemented as software programs. In further embodiments, an image may display features which may comprise a plurality of contoured effects, such as outlined regions or portions of structures.

At step 203, a second image comprising a second plurality of structures is accessed. For example, the second image may comprise a display of similar anatomical region(s) for a different patient. The second image may comprise, for example, a second data scan of a data set generated by a medical imaging device. The medical imaging device may comprise the same imaging device as the imaging device which generated the data for the first data set. In some embodiments, the second image may be of the same data set as the first image. Alternatively, other imaging devices may also be used to generate the second data set. For example, in some instances, a radiation therapy machine may be equipped with CBCT or other imaging equipment. A patient receiving treatment from a radiation therapy machine may also be imaged by the imaging equipment. Other devices, such as magnetic resonance imaging devices or other similar medical imaging devices may also be used to acquire image data. The first and second images may be comprised by a set of training images for training the machine learning system.

The second image may, as with the first image, comprise a plurality of anatomical structures. These structures may include, but are not limited to all or a portion of similar structures as displayed in the first image. In some embodiments, the second image may consist of a display of an equivalent or substantially equivalent general anatomical region displayed in the first image, with an equivalent or substantially similar orientation, axes, dimensions, scope. Alternatively, the second image may comprise a display of a different plurality of anatomical features, wherein only portions of the anatomy displayed in the first image are visible, and which may differ in orientation, or other visual configurations and conditions with the display of the features in the first image.

At step 205, a ground truth comparison value is established based on a comparison of the first and second image data. The comparison of the first and second images may be made following a geometric transformation of image data comprised by at least one of the first and second image. In an embodiment, the geometric transformation may be a deformation of a first image according to a deformation field, followed by a registration of deformed first image structures with non-transformed second image structures. In an embodiment, the ground truth comparison may be based upon treatment plan information, where the first image data comprises first image treatment plan geometry associated with the first image structures, and where the second image data comprises second image treatment plan geometry associated with second image structures. In an embodiment, the first image data and the second image data each comprise radiation dose distribution information (dosimetry), and the ground truth comparison may be based upon the dosimetry information.

At step 207, features groups are extracted from the first and second images and/or their automatically segmented structures. The features are determined from the image pixel data, and may be for example contours of anatomical structures, bone diameters, an amount of water present, fat tissue present, size of lung tissue, a tumor contour, etc.,—any features that are determined to be discriminative by an expert for training of the machine learning system are consistent with the spirit and scope of the present disclosure. In some embodiments, the features are extracted from image data that has not been subjected to geometric transformation (e.g., without deformable registration).

At step 209, a machine learning system may be trained using the first and second image features groups extracted at step 207 as inputs to the machine learning system, and the ground truth established at step 205 as the expected output of the machine learning system. In an embodiment, training includes tuning internal weights of an image comparison tool in order to bring its image ranking behavior to an agreement with the ranking provided by the ground truth. Other training methods are possible, including comparing ground truth ranking with feature-based ranking using regression tree analysis, or using support vector regression. The machine learning system may be trained using many comparisons, each comparison comprising different combinations of training images from a set of training images, with the weight values refined with each comparison. The result of the training is such that a comparison made using the generated image comparison tool may be brought into an agreement to the ground based comparison.

At step 211, an image comparison tool is generated based on the training from step 209. The image comparison tool may be trained to estimate image differences based upon the similarity determined for the ground truth comparison in step 205. The image comparison tool is able to provide an efficient search for a suitable atlas image for autosegmentation of a current (new, or target) patient image, based upon selected structures determined to be of interest.

Selecting an Atlas Image Based on an Image Comparison Tool

An image comparison may be made between a current image (such as a new patient image) and indexed images stored in a data storage, based on an image comparison tool trained using a machine learning process (e.g., from training process 100). The image comparison tool is able to use features extracted from the respective images in order to make the comparison. In an embodiment, finding a similar image in a data storage comprises comparing the features of all (or a subset) of the images in the data storage to the features of the target (new patient) image and choosing one or more with a reasonably small difference value. In this disclosure, an indexed image may be one that has already had its features extracted and stored in a data storage. In an embodiment the feature extraction may be performed in an offline process, such that for each image a corresponding features group associated with that image is extracted and stored in the data storage, prior to a comparison made using the image comparison tool. Such indexed images may also be referred to herein as "reference" images, each reference image having a corresponding reference features group.

Figure 3:
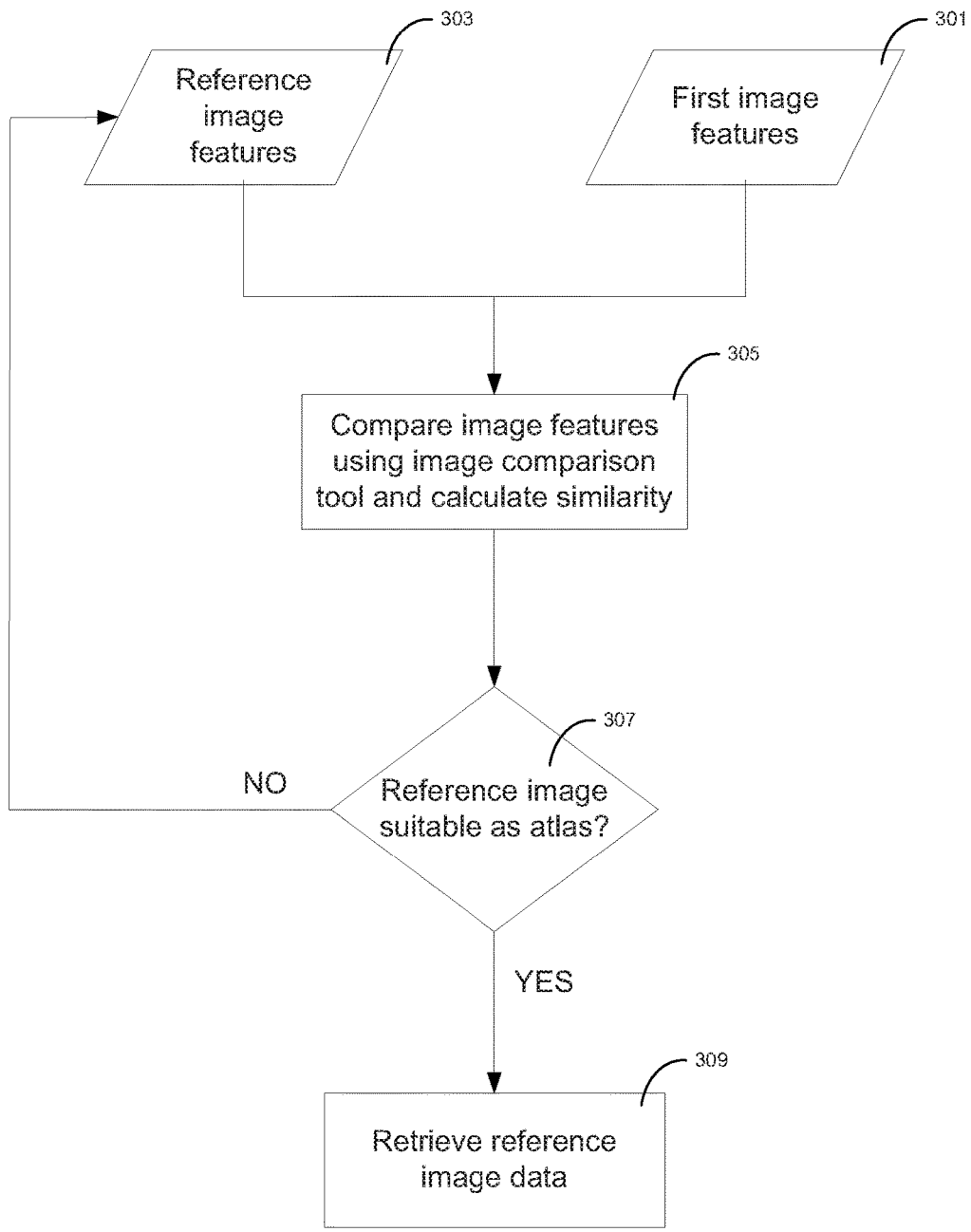
FIG. 3 depicts a flowchart of a method for selecting an atlas based on an image comparison tool comparison, in accordance with embodiments of the present invention.

FIG. 3 depicts a flowchart 300 of a method for selecting a reference image to be used as an atlas for autosegmentation of a new patient image, in accordance with embodiments of the present invention. Steps 301-309 describe exemplary steps comprising the process depicted in flowchart 300 in accordance with the various embodiments herein described. In one embodiment, the flowchart 300 is implemented as computer-executable instructions stored in a computer-readable medium and performed by a computing device executing a process for selecting an atlas image for use in autosegmentation of a non-indexed image.

At step 301, first image features from a first image are accessed, where the first image may be, for example, a new patient image (e.g., a target image). In one embodiment, the first image features are determined from the first image pixel data. The features may be, for example, contours of anatomical structures, bone diameters, an amount of water present, fat tissue present, size of lung tissue, a tumor contour, etc. The first image features may represent a subset of first image pixel data. Acquisition of the first image data may be performed by generating image data of a plurality of images in a data set in an imaging device such as an X-ray, MRI, or other medical imaging device. According to various embodiments, the first image data may be acquired during, or in furtherance of, a diagnostic procedure. Once acquired, the first image data may be stored for future reference. In one embodiment, first image data may be stored by, accessed from, and manipulated in a dedicated software application. User input received through a graphical user interface of the software application may direct the storage, access, and manipulation of the file(s) comprising the image data.

In one embodiment, a computing device performing step 301 may be communicatively coupled to treatment and/or imaging equipment, thereby allowing the data comprising the first image, once acquired, to be accessed immediately by the executing computing device. Alternatively, data for one image or the entire data set may be likewise pre-imaged and stored in the data storage repository accessed at step 303.

At step 303, a group of reference image features are accessed. In an embodiment the group of reference features is stored in a data storage having multiple groups of reference features, where each group of reference features has a corresponding reference image. In an embodiment the reference features are stored in a data storage independent from the reference images data storage. Alternatively, the groups of reference image features and the reference images are stored in the same data storage.

At step 305, the first image features from step 301 and the reference image features from step 303 are compared using an image comparison tool, and a similarity is calculated. In an embodiment the image comparison tool performs the comparison on a feature-by-feature basis, such that the differences between like features from the first image features and the reference image features are determined. For example, the features may be grouped into categories (e.g., number and/or position of bone pixels, water pixels, fat pixels), each category having a weight, and the image comparison tool makes a comparison category-to-category, each category's contribution to the overall similarity determined according to the weight for that category. In an embodiment, the image comparison tool is trained by a machine learning system process, such as process 200 in FIG. 2.

In some embodiments, the comparison of step 305 may include calculation of a quantized similarity, e.g., a similarity index. Methods and algorithms for calculation of similarity index of image features are available in the art including calculation of mutual information, cross correlation, and pattern intensity etc., of the image features. These and other methods and algorithms are known in the art and therefore their detail description is omitted herein. A greater similarity index value may indicate a greater similarity between the images. A smaller similarity index value may indicate more dissimilarity between the images. For instance, the similarity index value can be very high in cases where the images compared are of the same anatomical region, or the index value can be very low in cases where the images compared are from different anatomical regions.

At step 307 a determination is made of whether the calculated similarity from step 305 is indicative of a reference image suitable for use as an atlas. In the case of the reference image being determined not to be suitable, the method returns to step 303 and a new reference image features group is accessed. Thereafter step 305-307 are repeated for the newly accessed reference features group. The method continues in this manner until a determination is made at step 307 of the calculated similarity from step 305 indicating a suitable atlas image, at which point the method proceeds to step 309.

The determination of a suitable atlas at step 307 may be made according to one or more criteria. In an embodiment, steps 301-305 are executed for all groups of reference image features in a data store, and the groups of reference image features are ranked according to the similarity with the first image features determined at step 305. Alternatively, a predetermined number of reference images may be ranked. In an embodiment, an atlas image may be chosen according to the reference image having the best similarity index value. In an embodiment, several candidate atlas images may be indicated, each having a sufficiently high similarity index value.

In an embodiment, a tolerance threshold can be defined for determining whether the reference image features 303 are sufficiently similar to the first image features 301 so as to indicate the corresponding reference image is suitable for use as an atlas for autosegmentation of the first image. The tolerance threshold may define a threshold error for the comparisons of the features, where a higher similarity index value indicates a smaller error (dissimilarity) between the features. If the similarity index value exceeds the defined tolerance threshold, a message can be generated to notify a user of the possibility of a suitable reference image for autosegmentation of a current patient image. If the similarity index value falls below the defined tolerance threshold, a new reference image features group may be accessed in order to perform a new comparison. Identification of a reference image suitable for use as an atlas for atlas-based autosegmentation of the current patient image may be based on the calculated value of the similarity index. In some embodiments, the tolerance threshold may be dynamic and adaptive.

At step 309 reference image data is retrieved corresponding to the reference image features group having the determined requisite similarity to the first image features. The reference image data retrieved at step 309 may be used for performing autosegmentation of the first image. In an embodiment, the reference image retrieved at step 309 corresponds to first reference image features group that is found to have sufficient similarity with the first image features, at step 307.

In an embodiment, more than one reference image may be retrieved according to process 300. For example, a predetermined number of reference images may be sought, and the process 300 may be executed until the predetermined number of reference images are identified according to the groups of reference image features found to be suitable at step 307 (e.g., the highest ranked predetermined number of reference images, or the predetermined number having at least threshold similarity). In an embodiment, if process 300 fails to find a group of reference image features that are suitable (at step 307), the process 300 may be repeated again with an eased tolerance for similarity between the reference image features and the first image features. This sequence may continue until at least one group of reference image features is found to be a suitable atlas.

In an embodiment, process 300 may be repeated using a different image comparison tool at step 305, e.g., a second image comparison tool that is trained from a process such as process 200, but using a different ground truth comparison than that used to train the first image comparison tool. For example, the first image comparison tool may be based upon comparing liver contours in the images, and the second image comparison tool may be based on comparing bone structures in the images. Training and generation of a multitude of image comparison tools, each according to a distinct ground truth comparison for training the machine learning system, is consistent with the spirit and scope of the present disclosure.

Figure 4:
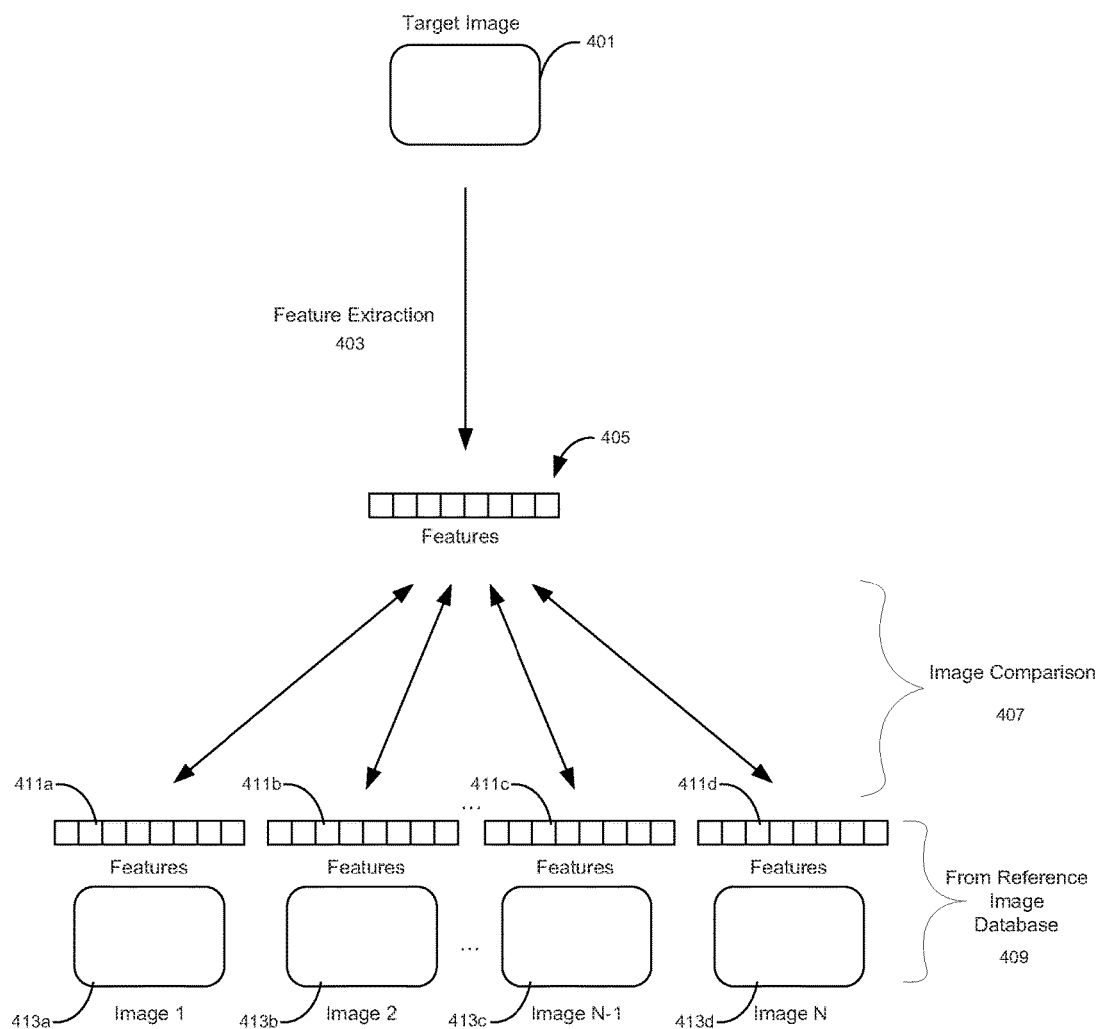
FIG. 4 is an illustration of an exemplary comparison of target image features with a set of reference features using an image comparison tool, in accordance with embodiments of the present invention.

FIG. 4 is an illustration of an exemplary comparison 400 of target image features 405 with a set of reference features 407, using an image comparison tool 407, in accordance with embodiments of the present invention. In an embodiment, a target image 401 is accessed and feature extraction 403 is performed in order to extract features of interest. The target image 401 may be an image of a new patient, for whom a treatment plan is sought. The image may be acquired by a radiation and treatment machine. The target image 401 may be accessed following an imaging session, or may be stored in a data storage and accessed at a time subsequent to the imaging session.

Feature extraction 403 generates a target image features group 405. The target image features group 405 may be determined from target image 401 pixel data, and may be, for example, contours of anatomical structures, bone diameters, an amount of water present, fat tissue present, size of lung tissue, a tumor contour, etc. In an embodiment, the features group 405 may be extracted from a subset of target image 401 pixel data. The features group 405 may be extracted from image pixel data that has not been subject to geometric transformation (e.g., has not undergone deformation for registration with another image).

Once extracted, features group 405 may be compared with groups of features from reference images in order to determine a similarity in the images from which the respective features groups are generated. Reference features groups 411a-411d are features groups that have been generated from corresponding reference images 413a-413d. Reference features groups 411a-411d and reference images 413a-413d may be stored in and accessed from a reference image database 409. In an embodiment, reference features groups 411a-411d and reference images 413a-413d are stored in the same data storage. Alternatively, reference features groups 411a-411d and reference images 413a-413d may be stored in separate data storages. In an embodiment, reference image database 409 contains a number N of reference images, and each reference image in the data store has a corresponding group of reference features.

According to an aspect of the present disclosure, the comparison of the target image features group 405 and the reference features groups 411a-411d may be performed utilizing image comparison tool 407, and one reference features group is determined to be of sufficient similarity (e.g., a "match") to indicate a corresponding reference image that may be used as an atlas for autosegmentation of the target image 401. Alternatively, a predetermined number of reference images for autosegmentation may be sought, and the comparison of the target image features group 405 and the reference features groups 411a-411d proceeds until the predetermined number of matches are found. Alternatively, the reference features groups 411a-411d may be searched and ranked according to the determined similarity found by image comparison tool 407, and the best match, or predetermined number of matching reference images may be indicated.

According to an embodiment, feature groups are organized in categories, with each category having a weight, and the image comparison tool comparison 407 includes comparing features category-by-category. A greater importance may be given to comparisons of feature categories having higher weight values than other categories. The weights of feature categories may be pre-determined prior to process 400, e.g., via a training process 100.

Exemplary Computing Device

Figure 5:
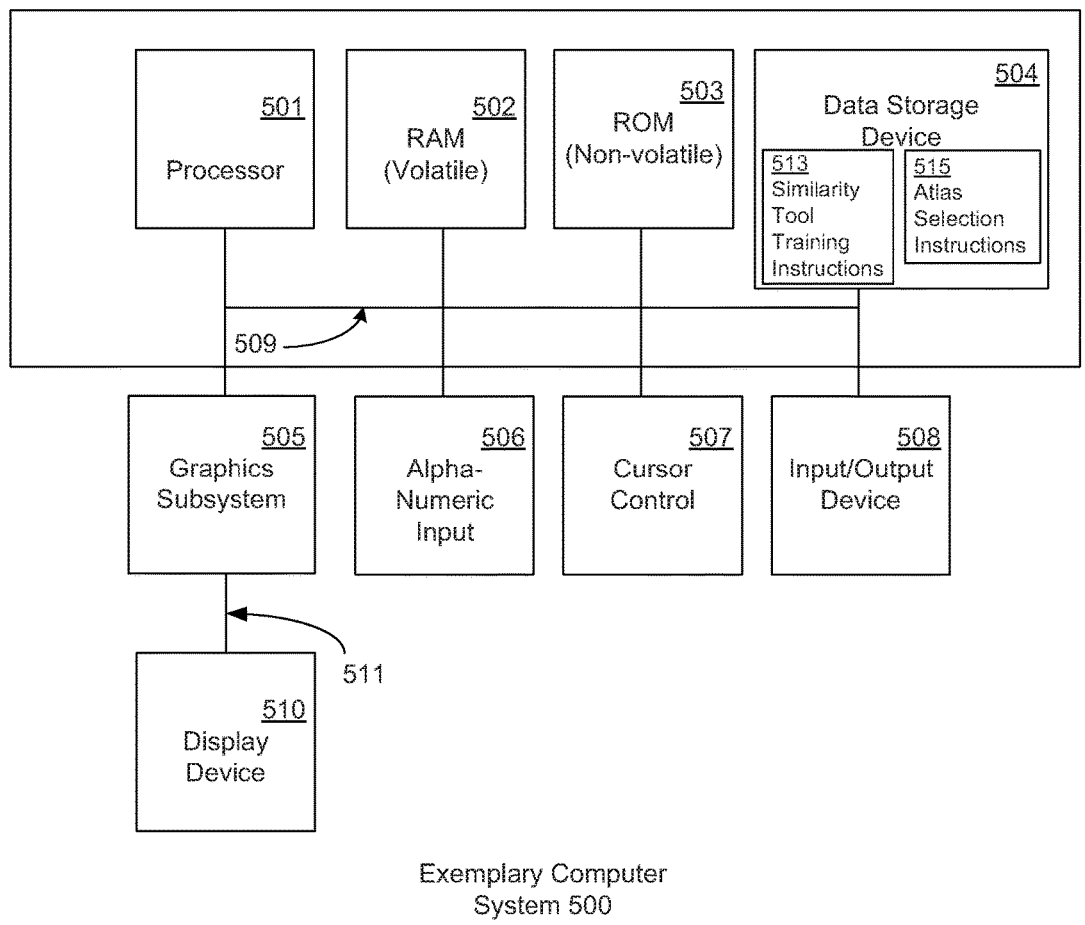
FIG. 5 depicts an exemplary computing environment, in accordance with embodiments of the present invention.

As presented in FIG. 5, an exemplary system upon which embodiments of the present invention may be implemented includes a general purpose computing system environment, such as computing system 500. In its most basic configuration, computing system 500 typically includes at least one processing unit 501 and memory, and an address/data bus 509 (or other interface) for communicating information. Depending on the exact configuration and type of computing system environment, memory may be volatile (such as RAM 502), non-volatile (such as ROM 503, flash memory, etc.) or some combination of the two. In some embodiments the memory is substantially radiation-hardened, using substrates and/or logical methods known to those skilled in the art.

Computer system 500 may also comprise an optional graphics subsystem 505 for presenting information to the computer user, e.g., by displaying information on an attached display device 510, connected by a video cable 511. According to embodiments of the present claimed invention, the graphics subsystem 505 may be coupled directly to the display device 510 through the video cable 511. A graphical user interface of an image viewing software application executing in the computer system 500 may be generated in the graphics subsystem 505, for example, and displayed to the user in the display device 510. In alternate embodiments, display device 510 may be integrated into the computing system (e.g., a laptop or netbook display panel) and will not require a video cable 511.

Additionally, computing system 500 may also have additional features/functionality. For example, computing system 500 may also include additional storage (removable and/or non-removable) including, but not limited to, magnetic or optical disks or tape. Such additional storage is illustrated in FIG. 5 by data storage device 504. Computer storage media includes volatile and nonvolatile, removable and non-removable media implemented in any method or technology for storage of information such as computer readable instructions, data structures, program modules or other data. RAM 502, ROM 503, and data storage device 504 are all examples of computer storage media.

In an embodiment, computer system 500 comprises instructions for performing processes according to aspects of the present disclosure, where the instructions may be stored on RAM 502, ROM 503, and/or data storage 504. For example, the computer system 500 may comprise image similarity tool training instructions 513, where image similarity training instructions 513 contain instructions causing computer system 500 to perform a process of training an image comparison tool according to embodiments of the present disclosure (e.g., process 200). In an embodiment, computer system 500 comprises atlas selection instructions 515, where atlas selection instructions 515 contain instructions causing computer system 500 to perform a process of selecting an atlas using an image comparison tool, according to embodiments of the present disclosure (e.g., process 300).

Computer system 500 also comprises an optional alphanumeric input device 506, an optional cursor control or directing device 507, and one or more signal communication interfaces (input/output devices, e.g., a network interface card) 508. Optional alphanumeric input device 506 can communicate information and command selections to central processor 501. Optional cursor control or directing device 507 is coupled to bus 509 for communicating user input information and command selections to central processor 501. Signal communication interface (input/output device) 508, also coupled to bus 509, can be a serial port. Communication interface 509 may also include wireless communication mechanisms. Using communication interface 509, computer system 500 can be communicatively coupled to other computer systems over a communication network such as the Internet or an intranet (e.g., a local area network), or can receive data (e.g., a digital television signal).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
performing, with a processor that executes instructions for training an image comparison tool a comparison of a medical image pair to generate a first similarity result, wherein said performing the comparison of the medical image pair includes deforming at least one medical image of the medical image pair;
performing a comparison of extracted features from the medical image pair with the image comparison tool to generate a second similarity result; and
tuning the image comparison tool to increase correspondence between the first similarity result and the second similarity result.

2. The method of claim 1, further comprising:
repeating said performing the comparison of the medical image pair, said performing the second comparison of the extracted features from the medical image pair, and said tuning for a respective one of a plurality of medical image pairs.

3. The method of claim 2, wherein the first similarity result is indicative of similarity between a first anatomical structure of a first medical image of the medical image pair and a second anatomical structure of a second medical image of the medical image pair.

4. The method of claim 3, wherein the first anatomical structure and the second anatomical structure are related to at least one of livers or bones.

5. The method of claim 4, wherein the first similarity result is indicative of similarity between a first combination of anatomical structures of a first medical image of the medical image pair and a second combination of anatomical structures of a second medical image of the medical image pair.

6. The method of claim 5, wherein said deforming comprises:
transforming original image data of one medical image of the medical image pair from an original spatial reference into a spatial reference in common with original image data of other medical image of the medical image pair.

7. The method of claim 6, wherein said performing the comparison of the medical image pair further comprises:
segmenting a first medical image of the medical image pair to generate a first segmented medical image;
segmenting a second medical image of the medical image pair to generate a second segmented medical image; and
using the first segmented medical image and the second segmented medical image to determine the first similarity result.

8. A method comprising:
performing, with a processor that executes instructions for training an image comparison tool a comparison of a medical image pair to generate a first similarity result by using non-deformed image data of a first medical image of the medical image pair and using deformed image data of a second medical image of the medical image pair that represents original image data transformed from an original spatial reference into a spatial reference in common with the nondeformed image data;
performing a comparison of extracted features from the medical image pair with the image comparison tool to generate a second similarity result; and
tuning the image comparison tool to increase correspondence between the first similarity result and the second similarity result.

9. The method of claim 8, further comprising:
repeating said performing the comparison of the medical image pair, said performing the comparison of the extracted features from the medical image pair, and said tuning for a respective one of a plurality of medical image pairs.

10. The method of claim 8, wherein the first similarity result is indicative of similarity between a first anatomical structure of the first medical image and a second anatomical structure of the second medical image.

11. The method of claim 10, wherein the first anatomical structure and the second anatomical structure are related to at least one of livers or bones.

12. The method of claim 8, wherein the first similarity result is indicative of similarity between a first combination of anatomical structures of the first medical image and a second combination of anatomical structures of the second medical image.

13. The method of claim 8, wherein said performing the comparison of the medical image pair comprises:
segmenting the first medical image to generate a first segmented medical image;
segmenting the second medical image to generate a second segmented medical image; and
using the first segmented medical image and the second segmented medical image to determine the first similarity result.

14. A method comprising:
providing an image comparison tool that is tunable by correspondence between a first image similarity result, that involves deformation of a first medical image relative to a second medical image, and a second image similarity result that is generated with the image comparison tool;
comparing target extracted features from a target medical image to reference extracted features from a plurality of reference medical images with the image comparison tool to generate a plurality of similarity results, wherein the target extracted features and the reference extracted features are non-deformed data; and
selecting, with a processor that executes instructions for selecting an atlas, a reference medical image as the atlas for the target medical image based on the plurality of similarity results.

15. The method of claim 14, further comprising:
using the atlas from performance of said selecting to segment the target medical image.

16. The method of claim 14, wherein said comparing comprises:
- arranging the target extracted features into a plurality of categories and the reference extracted features into the plurality of categories per reference medical image; and
- per reference medical image, comparing a category of target extracted features with a corresponding category of reference extracted features for a respective one of the plurality of categories.

17. The method of claim 14, wherein said comparing does not involve deformation of at least one medical image relative to another medical image.

18. The method of claim 14, wherein a respective similarity result of the plurality of similarity results is indicative of similarity between the target medical image and a respective reference medical image.

19. The method of claim 14, wherein the first image similarity result is indicative of similarity between a first anatomical structure of the first medical image and a second anatomical structure of the second medical image.

20. The method of claim 19, wherein the first anatomical structure and the second anatomical structure are related to at least one of livers or bones.

* * * * *